US011435006B2

(12) United States Patent
Schudt et al.

(10) Patent No.: US 11,435,006 B2
(45) Date of Patent: Sep. 6, 2022

(54) ELECTROMAGNETIC ACTUATING DEVICE

(71) Applicant: Robert Bosch GmbH, Stuttgart (DE)

(72) Inventors: Klaus Schudt, Nordheim (DE); Bernhard Gnamm, Vaihingen/Enz (DE); Ursula Luetzelberger, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/990,493

(22) Filed: Aug. 11, 2020

(65) Prior Publication Data
US 2021/0156489 A1 May 27, 2021

(30) Foreign Application Priority Data
Nov. 22, 2019 (DE) .......................... 102019218094.9

(51) Int. Cl.
*F16K 31/06* (2006.01)
*H01F 7/06* (2006.01)

(52) U.S. Cl.
CPC ...... *F16K 31/0675* (2013.01); *F16K 31/0655* (2013.01); *H01F 7/06* (2013.01)

(58) Field of Classification Search
CPC ............. F16K 31/0606; F16K 31/0651; F16K 31/0686; F16K 31/0696; H01F 2007/085
See application file for complete search history.

(56) References Cited

U.S. PATENT DOCUMENTS

| 4,339,082 A * | 7/1982 | Radaelli | F02M 51/0667 239/585.4 |
| 4,719,943 A * | 1/1988 | Perach | F16K 31/0606 137/625.65 |
| 4,922,965 A * | 5/1990 | Meister | F16K 31/0606 137/625.65 |
| 4,932,439 A * | 6/1990 | McAuliffe, Jr. | F16K 31/0606 137/625.65 |
| 4,998,559 A * | 3/1991 | McAuliffe, Jr. | F16H 61/0251 137/596.17 |
| 5,345,669 A * | 9/1994 | Zigler | H01F 41/0253 29/598 |
| 8,854,164 B2 * | 10/2014 | Fleischer | H01F 7/1607 335/220 |
| 9,423,045 B2 * | 8/2016 | Mills | F16K 27/048 |
| 9,528,626 B2 * | 12/2016 | Holmes | H01F 7/1607 |
| 10,388,446 B2 * | 8/2019 | Ott | H01F 41/00 |
| 2004/0085169 A1 * | 5/2004 | Matsusaka | H01F 7/121 335/220 |
| 2020/0118724 A1 * | 4/2020 | Sen | H01F 7/081 |
| 2020/0203049 A1 * | 6/2020 | Schudt | H01F 7/081 |
| 2020/0203105 A1 * | 6/2020 | Schudt | H01H 50/18 |

FOREIGN PATENT DOCUMENTS

DE  102005030657 B3  11/2006

* cited by examiner

*Primary Examiner* — Matthew W Jellett
(74) *Attorney, Agent, or Firm* — Norton Rose Fulbright US LLP; Gerard Messina

(57) ABSTRACT

An electromagnetic actuating device is described. The electromagnetic actuating device includes a pole sleeve, an armature disposed radially within the pole sleeve and a coil form of an electromagnetic coil disposed radially outside of the pole sleeve. The armature has a first armature end face at one end and a second armature end face at the opposite end. On or in the coil-form wall, the coil form has a longitudinal channel extending along the longitudinal direction of the coil form, by which a flow connection is created between the armature end faces.

12 Claims, 3 Drawing Sheets

ELECTROMAGNETIC ACTUATING DEVICE

CROSS REFERENCE

The present application claims the benefit under 35 U.S.C. § 119 of German Patent Application No. DE 102019218094.9 filed on Nov. 22, 2019, which is expressly incorporated herein by reference in its entirety.

FIELD

The present invention relates to an electromagnetic actuating device.

BACKGROUND INFORMATION

In the case of automatic transmissions for cars, hydraulically actuated clutches are used for changing gears, the hydraulic pressure at the clutches being adjusted by hydraulic slide gate valves. Slide gate valves may be actuated via a pilot valve (pilot control) or directly via an electromagnetic actuating device. In order to achieve damping, such actuating devices are filled with oil, in response to a movement of the armature of the actuating device, oil being forced out of the diminishing space upstream of the armature and being pumped via an overflow channel into the enlarging space downstream of the armature. The armature movement is damped by this pumping process. Since transmission oil has a high aeration capability, in practice, the problem of a fluctuating oil level in the armature space arises, which makes constant damping difficult. For example, the overflow channels are realized as boreholes in the armature, as shown in German Patent Application No. DE 10 2005 030 657 A1. In addition to costly manufacture, this may lead to a throttled magnetic flux and reduced magnetic forces due to the reduction of the armature cross-section.

SUMMARY

An object of the present invention is to provide an electromagnetic actuating device. Advantageous further developments of the invention are described herein.

According to an example embodiment of the present invention, an electromagnetic actuating device is provided, which has a pole sleeve (flux sleeve), an armature (solenoid armature) disposed radially within the pole sleeve and an electromagnetic coil which is disposed radially outside of the pole sleeve and has a coil form. The armature may be guided directly or indirectly within the pole sleeve, e.g., by a sliding fit. By activating the electromagnetic coil, the armature may be shifted along its longitudinal direction in the electromagnetic actuating device. This corresponds to the classic assembly of an electromagnetic actuating device.

At one end, the armature has a first armature end face, and at the opposite end, a second armature end face. On or in the coil-form wall, the coil form of the electromagnetic coil has a longitudinal channel extending along the longitudinal direction of the coil form, by which a flow connection (hydraulic connection) is able to be produced or is formed between the end faces of the armature.

The longitudinal channel (overflow channel) on or in the coil-form wall permits an overflow of oil between the armature end faces in response to armature movement, an adverse effect on the magnetic circuit largely being avoided. It is not necessary to form overflow channels in the armature. This simplifies the manufacture of the armature, while weakening of the magnetic circuit is by and large avoided.

Because the pole sleeve is able to be manufactured as a closed sleeve, it may be produced with sufficient manufacturing precision. Good guidance of the armature is possible. The measures indicated contribute to a cost-effective design.

The pole sleeve (flux sleeve) may have an essentially cylindrical cross-section. "Essentially cylindrical" includes that the sleeve may have collars, offsets, grooves, changes in wall thickness, etc., but all in all is cylinder-like or tube-like. The pole sleeve may be secured in rotatably fixed fashion in the actuating device. Armature, sleeve and electromagnetic coil are disposed in (axial) overlap relative to each other. In particular, the electromagnetic actuating device may be an electromagnetic control element or an electromagnetic actuator ("electromagnet").

According to one further development of the present invention, on or in the pole-sleeve wall, the pole sleeve may have one or more channels or channel sections that are in fluid connection with the longitudinal channel of the coil form. The flow resistance (hydraulic resistance) on or in the longitudinal channel may be reduced in this manner. This contributes to positive flow characteristics. The channels or channel sections may be formed as recesses or passages in the wall of the pole sleeve, e.g., as punch-outs. It is likewise possible to form the channels or channel sections as slots or grooves directed particularly along the longitudinal direction.

According to a further development of the present invention, the pole sleeve, particularly together with its channels or channel sections, may be formed by punching and rolling (pole sleeve is punched and rolled). The base material of the pole sleeve may be punched out, and the pole sleeve may be brought into its essentially cylindrical shape by rolling. The channels or channel sections may be formed directly during the punching process, e.g., by stamping (recesses or depressions) or by classic punching (passages in the form of punch-outs) prior to the rolling. To form a channel or channel section, it is likewise conceivable to leave a longitudinal gap open at the splice during the rolling. This is an inexpensive and uncomplicated manufacturing method.

According to one further development of the present invention, the pole sleeve may be made of magnetically conductive, unalloyed steel, particularly with a carbon content of less than 0.15 percent (carbon content<0.15%). This material facilitates the manufacturing (easy punching and rolling) and supplies a high degree of magnetic efficiency.

According to one further development of the present invention, the coil form, especially together with its longitudinal channel, may be formed by injection molding (coil form with longitudinal channel formed as injection-molded part). This facilitates the manufacturing. No further production step is necessary to form the longitudinal channel.

According to one further development of the present invention, the armature may be free of channels, particularly free of overflow channels. In other words, the armature may be free of boreholes or grooves which create overflow channels. This contributes to cost-effective manufacture and a comparatively large effective cross-sectional area of the armature.

According to one further development of the present invention, the longitudinal channel of the coil form and the channels or channel sections of the pole sleeve together may form one common channel (common flow channel), the common channel having a first channel cross-section which tapers in places to a second channel cross-section. To that end, the channels or channel sections may be dimensioned accordingly and/or may be formed only sectionally along the longitudinal direction of the actuating device, for example, in the form of channels or channel sections formed axially in sections in the pole sleeve.

The first channel cross-section may have a cross-sectional area of 2 percent or more (≥2%) of the (pumping) armature cross-sectional area. Preferably, this cross-section requirement applies to 60 percent or more of the length of the common channel (≥60% of the channel length). In this way, too high a damping effect may be avoided.

The second channel cross-section may have a cross-sectional area of 0.5 to 1.5 percent (0.5%-1.5%) of the (pumping) armature cross-sectional area. Preferably, this cross-section requirement applies to 40 percent or less of the length of the common channel (≤40% of the channel length), the sums of the channel lengths together amounting to 100% of the channel length, thus together corresponding to the channel length (sleeve length). In this manner, a ("diaphragm-like") temperature-independent damping may be achieved.

According to one further development of the present invention, the pole sleeve may be formed in one piece. This reduces the number of actuating-device components to be produced and assembled. As already indicated, the pole sleeve may have recesses or passages, which (in the assembled state) are flow-connected to the longitudinal channel in the coil form, and form one common channel.

Alternatively, the pole sleeve may be formed in several parts, particularly with a pole ring (surrounding the pole core and slotted optionally by a longitudinal slot) and a guide sleeve (surrounding the armature). The pole sleeve is thus formed by a pole ring and a guide sleeve. By producing individual components, the individual components may be adapted individually during production. For example, different materials may be used.

According to one further development of the present invention, the pole sleeve may be secured in rotatably fixed fashion in the actuating device in such a way that the longitudinal channel or the common channel is located in the direction of gravitational force above the armature (in the upper area of the electromagnet) or in the direction of gravitational force below the armature (in the lower area of the electromagnet). The statements with regard to the direction of gravitational force relate to the mounted position of the electromagnetic actuating device, e.g., on an automatic transmission of a car. The pole sleeve is fitted in rotatably fixed fashion in the actuating device and has no capability of rotating during operation. It is thus possible to orient the longitudinal channel or common channel in such a way that it lies at the lowest position (in the direction of gravitational force below the armature), and a low oil level already provides for the necessary damping. For applications in which the damping should be small, the longitudinal channel or common channel may be placed at the highest position (in the direction of gravitational force above the armature), so that a small air cushion in the armature space already ensures that the damping drops to a minimum.

According to one further development of the present invention, in order to guide the armature, a glass-fabric foil coated with PTFE (polytetrafluoroethylene) may be disposed radially between the pole sleeve and the armature. A guide element is thus provided for the armature, whereby positive sliding properties may be attained. For example, the glass-fabric foil coated with PTFE may be shaped to form a sleeve. For instance, the coated glass-fabric foil may be attached at the inner circumference of the pole sleeve, e.g., by adhesive bonding.

Alternatively, the pole sleeve at its inner circumference and/or the armature at its outer circumference may have at least sectionally, preferably completely, a magnetically non-conductive coating, particularly a nickel coating or a nickel-phosphorus coating. Positive sliding properties may be attained in this manner, as well.

According to one further development of the present invention, at the end of the armature facing away from the pole core, the actuating device may be closed by a magnetic cover, one or more cutouts preferably being formed in the magnetic cover which continue the longitudinal channel of the pole sleeve at the second armature end face. Thus, positive flow characteristics may also be achieved at the end of the longitudinal channel or the created common channel, which is located at the second armature end face.

The electromagnetic actuating device may have further components. Thus, the electromagnetic actuating device may have a housing (magnet housing) in which the components of the actuating device are accommodated. At one end face, particularly at the end face facing the pole core, the actuating device may be closed by an end piece, e.g., a flux disk. As already indicated, at the opposite end face, particularly at the end face facing away from the pole core, the actuating device may be closed by a cover (magnetic cover).

For connecting the electromagnetic actuating device, an electrical contacting may be provided which is connected electrically to the electromagnetic coil, for example, a socket part or a plug part attached to the housing. An actuating element, e.g., an actuating pin, may be inserted into the pole core, which is guided through a passage formed concentrically in the pole core. The actuating element may have a shaft section and a radially enlarged head section, with which it rests at the inside of the passage against the pole core.

In the following, possible specific embodiments of the present invention are explained with reference to the figures.

DETAILED DESCRIPTION OF EXAMPLE EMBODIMENTS

Figure 1A:
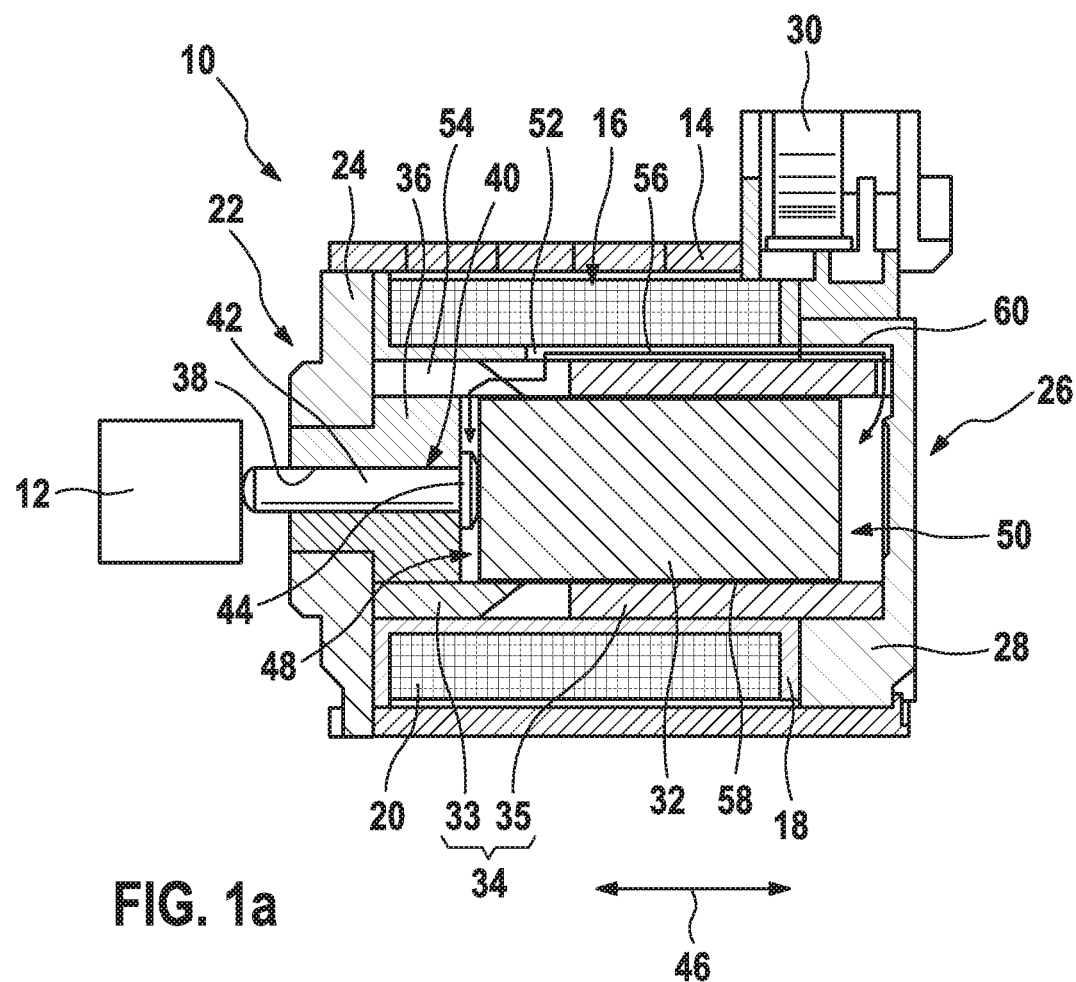
FIGS. 1a and 1b show a schematic cross-section through an electromagnetic actuating device (FIG. 1a), and in an enlarged view, a portion of the pole sleeve of the actuating device (FIG. 1b).

In FIG. 1a, an electromagnetic actuating device as a whole bears the reference numeral 10 (hereinafter "actuating device 10"). Such an actuating device 10 is used in transmission engineering for motor vehicles, for example, particularly for controlling a clutch of an automatic transmission. To that end, for instance, a hydraulic valve, which is indicated only schematically in FIG. 1a by a box provided with reference numeral 12, is actuated by actuating device 10.

Actuating device 10 has a housing 14, in which the components of actuating device 10 are disposed. Actuating device 10 has an electromagnetic coil 16, which is provided with a coil form 18 and a winding 20. Housing 14 is closed at a first end face 22 by an end piece 24, e.g., a flux disk 24.

At a second end face 26, the housing is closed by a cover 28, e.g., a magnetic cover 28. Also provided on housing 14 is an electrical contacting 30, which is connected electrically to electric [sic] coil 16.

In addition, actuating device 10 has an armature 32 (solenoid armature), a pole sleeve 34 (flux sleeve) and a pole core 36. Pole core 36 has a centric passage 38, through which an actuating element 40 (actuating pin) is guided, that acts on hydraulic valve 12. Actuating element 40 may have a shaft section 42 as well as a radially enlarged head section 44.

Armature 32 is disposed radially within pole sleeve 34. Electromagnetic coil 16 is disposed radially outside of pole sleeve 34. Coil 16, armature 32 and pole sleeve 34 overlap each other at least partially along axial direction 46. At one end, armature 32 has a first armature end face 48 (facing pole core 36), and at the opposite end, a second armature end face 50 (facing away from pole core 36).

Figure 2A:
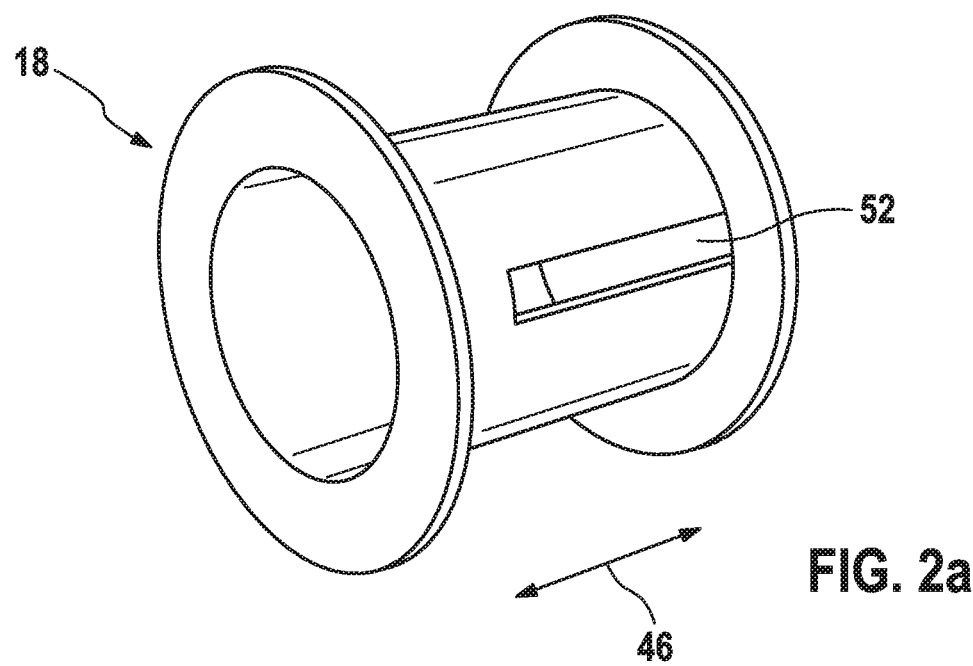
FIGS. 2a and 2b show the coil form of the actuating device from FIG. 1a in a perspective view (FIG. 2a) and the magnetic cover of the actuating device from FIG. 1a in a top view (FIG. 2b).

On or in the coil-form wall, coil form 18 has a longitudinal channel 52 extending along longitudinal direction 46 of coil form 18, by which a flow connection (hydraulic connection) is formed between armature end faces 48, 50 (see FIG. 1a and FIG. 2a).

Figure 1B:
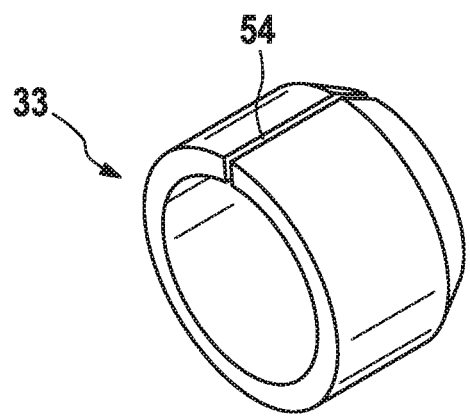

On or in the wall of pole sleeve 34, pole sleeve 34 may have one or more channels or channel sections, which are flow-connected to longitudinal channel 52. In the present embodiment, pole sleeve 34 is formed in several parts and has a pole ring 33 and a guide sleeve 35 (see FIGS. 1a and 1b). Pole ring 33 and guide sleeve 35 are situated axially adjacent to one another. Pole ring 33 surrounds pole core 36 radially outwardly and has a longitudinal slot 54. A flow-through opening is formed by longitudinal slot 54 between first armature end face 48 and longitudinal channel 52 (channel section). Guide sleeve 35 surrounds armature 32 radially outwardly. As an option, at its outer circumference, guide sleeve 35 may have a channel (groove, gap or punch-out) or a plurality of channel sections (cutouts or punch-outs) which are flow-connected to longitudinal channel 52.

Pole sleeve 34, i.e., pole ring 33 and/or guide sleeve 35, is formed by punching and rolling, that is, it is first punched and then brought into its essentially cylindrical or sleeve-like shape by rolling. Pole sleeve 34, i.e., pole ring 33 and/or guide sleeve 35, is formed of magnetically conductive, unalloyed steel, particularly with a carbon content of less than 0.15 percent (<0.15%).

Coil form 18, especially together with its longitudinal channel 52, is formed by injection molding. Armature 32 is free of channels, particularly free of overflow channels.

Longitudinal channel 52 of coil form 18 and channels or channel sections 54 of pole sleeve 34, that is, of pole ring 33 and guide sleeve 35, together form one common channel 56 (indicated in FIG. 1 by arrow 56, which represents the oil flow in response to axial armature movement). Common channel 56 has a first channel cross-section that is tapered in places to a second channel cross-section (not shown). The cross-sectional areas of the first and second channel cross-section may be selected as described above.

Pole sleeve 34, that is, pole ring 33 and guide sleeve 35, is secured in rotatably fixed fashion in actuating device 10 in such a way that longitudinal channel 52, channels or channel sections 54 and common channel 56 are located in the direction of gravitational force above armature 32 (installed position of actuating device 10; see FIG. 1a). In specific embodiments not shown, these components may be secured in rotatably fixed fashion in actuating device 10 in such a way that the channels in question are located in the direction of gravitational force below armature 32.

In order to guide armature 32, a glass-fabric foil 58 coated with PTFE is disposed radially between pole sleeve 34, i.e., between pole ring 33 and/or guide sleeve 35, and armature 32. Glass-fabric foil 58 may be secured on the inner circumference of pole sleeve 34, that is, on the inner circumference of pole ring 33 and/or guide sleeve 35, by adhesive bonding, for example. Alternatively, pole sleeve 34, i.e., pole ring 33 and/or guide sleeve 35, at its inner circumference and/or armature 32 at its outer circumference, may have at least sectionally, preferably completely, a magnetically non-conductive coating, particularly a nickel coating or a nickel-phosphorus coating.

Figure 2B:
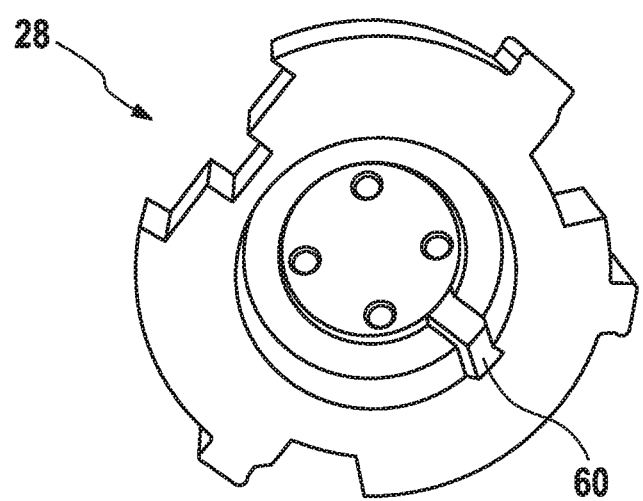

At the end of armature 32 facing away from pole core 36, actuating device 10 is closed by a magnetic cover 28 (see FIG. 1a). One or more cutouts 60 are formed in magnetic cover 28, which continue longitudinal channel 52 of coil form 18 at second armature end face 50 (see FIGS. 1a and 2b).

Figure 3A:
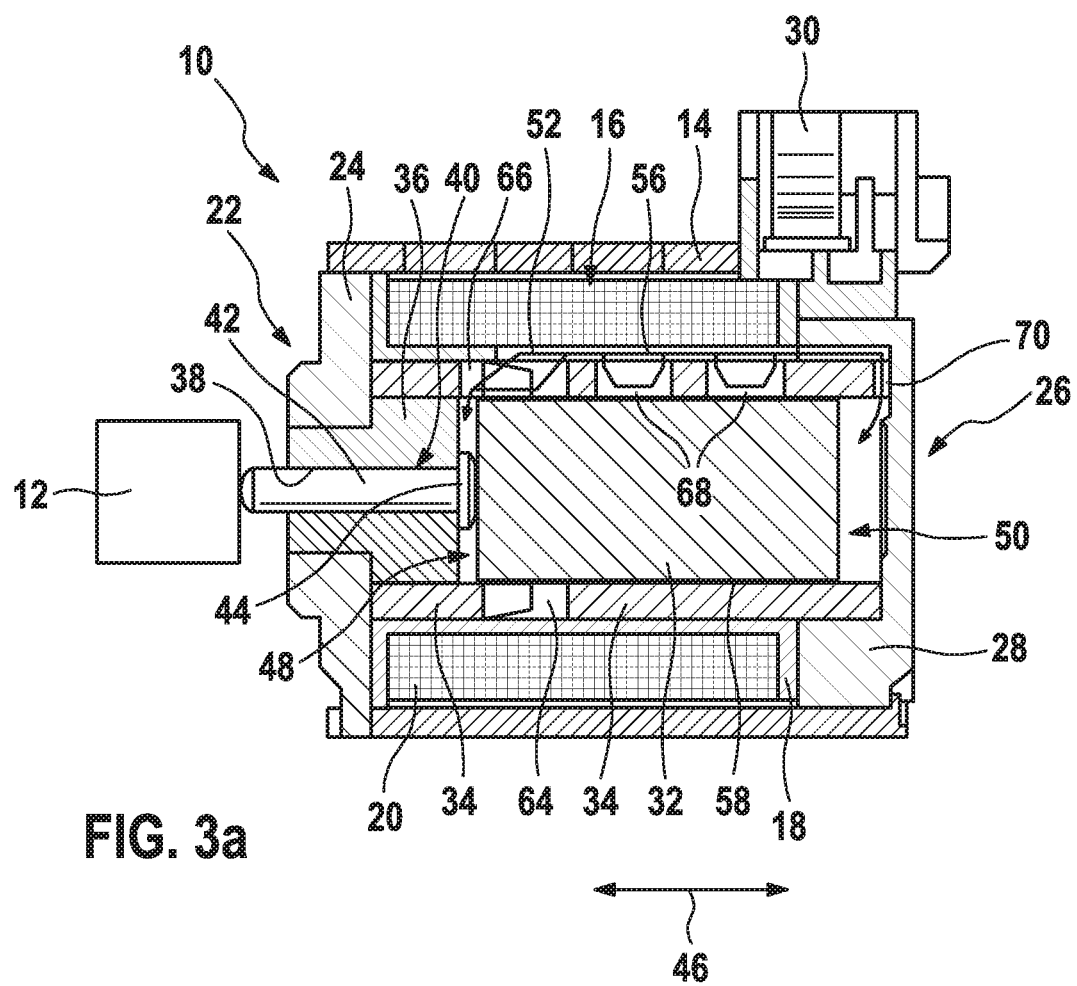
FIGS. 3a and 3b show one design possibility of the electromagnetic actuating device in a schematic cross-section (FIG. 3a) and the pole sleeve of the actuating device from FIG. 3a in a perspective view (FIG. 3b).
Figure 3B:
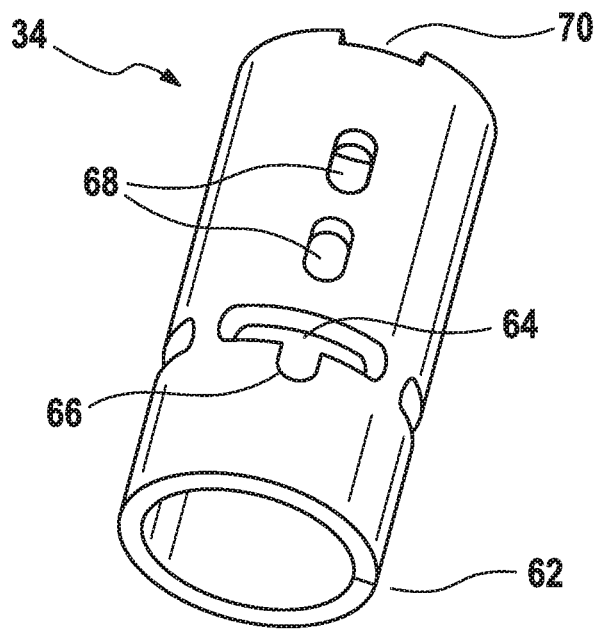

FIGS. 3a and 3b show a design of actuating device 10 which mostly corresponds to the specific embodiment described in FIGS. 1a through 2b (identical or functionally identical elements bear identical reference numerals). In the design according to FIGS. 3a and 3b, pole sleeve 34 is formed in one piece. (One-piece) pole sleeve 34 surrounds armature 32 and pole core 36 radially outwardly (see FIG. 3a).

Pole sleeve 34 is formed by punching and rolling, sleeve splice 62 optionally being closed. Pole sleeve 34 has a plurality of depressions and passages which may be punched and/or stamped directly into pole sleeve 34 during the punching of the base material of pole sleeve 34. The depressions and/or passages may create channels or channel sections.

Pole sleeve 34 has a punch-out 64 (see FIGS. 3a and 3b). Punch-out 64 has a section 66, which (in the installed state) is located axially between pole core 36 and first armature end face 48. Punch-out 64 (together with its section 66) allows a flow connection between longitudinal channel 52 of coil form 18 and first armature end face 48 (punch-out for the opening of the oil channel into the coil space).

Pole sleeve 34 has further punch-outs 68 which are in axial alignment with each other (see FIG. 3b). In the installed state, further punch-outs 68 align with longitudinal channel 52 of coil form 18, and with it, form one common channel 56 (see FIG. 3a). Punch-outs 68 are used to reduce the hydraulic resistance in common channel 56 (first channel cross-section of the common channel).

At the end facing magnetic cover 28, pole sleeve 34 has a frontal punch-out 70. Punch-out 70 allows a flow connection between longitudinal channel 52 of coil form 18 or common channel 56, and second armature end face 50 (punch-out for the opening of the oil channel into the armature space).

What is claimed is:

1. An electromagnetic actuating device, comprising:
a pole sleeve including a tubular wall;
an armature disposed (a) radially within the tubular wall of the pole sleeve and (b) axially between (1) a first chamber that is in front of the armature so that a front facing end face of the armature forms a rear wall of the first chamber and (2) a second chamber that is behind the armature so that a rear facing end face of the armature forms a front wall of the second chamber, wherein the armature is axially movable in a forward direction and in a rearward direction, thereby changing respective volumes of the first and second chambers; and a coil form including a tubular wall for holding an electromagnetic coil, wherein:

the tubular wall of the pole sleeve is disposed radially within the tubular wall of the coil form;

the tubular wall of the pole sleeve includes a cutout that extends radially through an entire thickness of the tubular wall of the pole sleeve;

the tubular wall of the coil form includes a slit that extends longitudinally within a thickness of the tubular wall of the coil form, the slit forming a longitudinal channel;

the coil form and the pole sleeve are circumferentially positioned relative to each other so that the cutout of the tubular wall of the pole sleeve opens in a radial outward direction into the slit; and the coil form, pole sleeve, and armature are arranged relative to one another so that a fluid flow path is provided in the electromagnetic actuating device by which:

in response to a shrinkage of the volume of the first chamber due to the axial movement of the armature in the forward direction, fluid in the first chamber flows radially outward from in front of the armature in the first chamber through the cutout of the tubular wall of the pole sleeve, into the slit of the tubular wall of the coil form, then rearward within the slit to a rear position of the slit, and then radially inward from the rear position of the slit into the second chamber behind the armature, the fluid thereby flowing out from the first chamber into the second chamber without passing through the armature; and in response to a shrinkage of the volume of the second chamber due to the axial movement of the armature in the rearward direction, fluid in the second chamber flows radially outward from behind the armature in the second chamber into the slit of the tubular wall of the coil form, then forward within the slit to a forward position of the slit, then radially inward from the forward position of the slit into and through the cutout of the tubular wall of the pole sleeve, and then into the first chamber in front of the armature, the fluid thereby flowing out from the second chamber into the first chamber without passing through the armature.

2. The electromagnetic actuating device as recited in claim 1, wherein the cutout in the tubular wall of the pole sleeve is formed as one or more channels or channel sections.

3. The electromagnetic actuating device as recited in claim 2, wherein the pole sleeve together with its channels or channel sections, is formed by punching and rolling, and/or the pole sleeve is formed of magnetically conductive, unalloyed steel, with a carbon content of less than 0.15 percent.

4. The electromagnetic actuating device as recited in claim 1, wherein the coil form together with its longitudinal channel, is formed by injection molding.

5. The electromagnetic actuating device as recited in claim 1, wherein the armature includes no channels through which the fluid can flow.

6. The electromagnetic actuating device as recited in claim 3, wherein the longitudinal channel of the coil form and the channels or channel sections of the pole sleeve together form one common channel, the common channel having a first channel cross-section that is tapered in places to a second channel cross-section.

7. The electromagnetic actuating device as recited in claim 1, wherein the pole sleeve is formed in one piece.

8. The electromagnetic actuating device as recited in claim 1, wherein the pole sleeve is formed in several parts with a pole ring and a guide sleeve.

9. The electromagnetic actuating device as recited in claim 1, wherein the pole sleeve is secured in rotatably fixed fashion in the actuating device in such a way that the longitudinal channel is located in a direction of gravitational force above the armature or in the direction of gravitational force below the armature.

10. The electromagnetic actuating device as recited in claim 1, wherein to guide the armature, a glass-fabric foil coated with PTFE is disposed radially between the pole sleeve and the armature, and/or the pole sleeve at its inner circumference and/or the armature at its outer circumference has at least sectionally magnetically non-conductive coating.

11. The electromagnetic actuating device as recited in claim 10, wherein the coating is a nickel coating or a nickel-phosphorus coating.

12. The electromagnetic actuating device as recited in claim 1, further comprising:

a pole core in front of the front facing end face of the armature;

wherein:

at the rear facing end of the armature, the actuating device is closed by a magnetic cover that includes a groove formed in a thickness of the magnetic cover;

a first leg of the groove is aligned with the longitudinal channel so that the longitudinal channel opens directly into the first leg of the groove;

the first leg of the groove extends in a same direction as an extension of the longitudinal channel immediately adjacent to the first leg of the groove; and the first leg of the groove opens directly into a second leg of the groove that extends from the first leg of the groove radially inward towards the second chamber, so that, in response to the shrinkage of the volume of the first chamber due to the axial movement of the armature in the forward direction, the fluid flows from the rear position of the slit into the first leg of the groove, then from the first leg of the groove into the second leg of the groove, and then radially inward inside the second leg of the groove into the second chamber behind the armature.

* * * * *